United States Patent
Narukawa et al.

[11] Patent Number: 5,770,332
[45] Date of Patent: Jun. 23, 1998

[54] PRISMATIC BATTERY

[75] Inventors: Satoshi Narukawa, Sumoto; Tooru Amazutsumi, Tsuna-gun; Hideki Fukuda; Yasuhiro Yamauchi, both of Sumoto, all of Japan

[73] Assignee: Sanyo Electric Co., Ltd., Osaka, Japan

[21] Appl. No.: 633,188

[22] Filed: Apr. 16, 1996

[30]     Foreign Application Priority Data

May 30, 1995  [JP]  Japan .................................... 7-131656

[51] Int. Cl.⁶ .................................................. H01M 2/06
[52] U.S. Cl. ........................... 429/175; 429/180; 429/181
[58] Field of Search ..................................... 429/163, 175, 429/180, 181, 185; 29/623.1, 623.2

[56]              References Cited

U.S. PATENT DOCUMENTS 5,537,733  7/1996  Kozawa et al. ...................... 29/623.5
5,556,722  9/1996  Narukawa et al. ..................... 429/163

Primary Examiner—Stephen Kalafut
Attorney, Agent, or Firm—Wenderoth, Lind & Ponack

[57]                  ABSTRACT

The outside edges of a sealing plate are weld attached to close off an opening in a metal case of a prismatic battery of this invention. The sealing plate has an electrode rivet which passes through an electrode hole and sandwiches an insulating gasket to attach in an electrically insulating fashion. The battery case houses an electrode group with either its positive or negative electrode plate connected to the electrode rivet. The sealing plate has a periphery region or reinforcement rib which is formed thicker than the rivet region where the electrode rivet attaches, and the outside edges of this reinforcement rib are weld attached to the case.

12 Claims, 8 Drawing Sheets

PRISMATIC BATTERY

BACKGROUND OF THE INVENTION

This invention relates to a prismatic battery in which the case opening is sealed closed by a weld attached sealing plate with an electrode rivet fixed to the sealing plate in a clasp-and-seal structure. Note that a prismatic battery has approximately square (90°) corners to form a shape approaching a rectangular solid (with some edge rounding).

FIG. 1 shows a cross-sectional view of a prismatic battery sealed by weld attachment of a sealing plate in the case opening. FIG. 2 shows a plan view of the sealing plate of the prismatic battery of FIG. 1, and FIG. 3 shows a cross-section across the width of the sealing plate of FIG. 1. The prismatic battery shown in FIG. 1 has a metal case 1 with an opening which is sealed closed by a metal sealing plate 4 which is weld attached to the case 1. The sealing plate 4 has an electrode rivet 9 fixed at its center. The electrode rivet 9 and the case 1 establish the positive and negative electrodes of the prismatic battery. For example, a prismatic battery with the case 1 taken to be the negative electrode has the sealing plate electrode rivet 9 as the positive electrode. Conversely, a prismatic battery with the case 1 taken to be the positive electrode has the sealing plate electrode rivet 9 as the negative electrode.

The sealing plate 4 is weld attached and electrically connected to the case 1. The electrode rivet 9 fixed to the sealing plate 4 becomes an electrode of opposite polarity to the case 1. Therefore, it is necessary to attach the electrode rivet 9 to the sealing plate 4 in an electrically insulated fashion. As shown in FIG. 3, an insulating gasket 10 is used with the sealing plate 4 to insulate the electrode rivet 9 from the sealing plate 4. The gasket 10 is sandwiched between the electrode rivet 9 and the sealing plate 4 to insulate the electrode rivet 9 from the sealing plate 4. The electrode rivet 9 passes through an electrode orifice 4B provided in the center of the sealing plate 4 and its lower end forms a clasp-and-seal structure to fix it to the sealing plate 4. The sealing plate 4 shown in FIG. 3 is provided with a sealing unit tab 5 disposed at the lower end of the electrode rivet 9. The electrode rivet 9 is inserted through a through-hole 5B in the sealing unit tab 5 and is joined to the sealing unit tab 5 by the clasp-and-seal structure formed by its lower end. The gasket 10 is held in place by the electrode rivet 9 and the sealing unit tab 5 in this configuration of sealing plate 4. Furthermore, an insulating plate 8 is sandwiched between the sealing unit tab 5 and the sealing plate 4.

The prismatic battery shown in FIG. 1 is fabricated by the following process steps.

(1) The electrode rivet 9 is riveted to the sealing plate 4 fixing it in a clasp-and-seal fashion. At this time, the sealing unit tab 5 is also fixed to the sealing plate 4. To attach the sealing unit tab 5 along with the electrode rivet 9, the lower end of the electrode rivet 9 is inserted through the through-hole 5B in the sealing unit tab 5 and is riveted in a clasp-and-seal fashion. The gasket 10 and the insulating plate 8 are sandwiched between the electrode rivet 9, the sealing unit tab 5, and the sealing plate 4 when the electrode rivet 9 is riveted. The gasket 10 is sandwiched between the electrode rivet 9 and the sealing plate 4, and the insulating plate 8 is sandwiched between the sealing unit tab 5 and the sealing plate 4. The electrode rivet 9 and the sealing unit tab 5 are attached to the sealing plate 4 in an electrically insulated fashion via the gasket 10 and the insulating plate 8.

(2) The sealing unit tab 5 of the sealing plate 4 is connected to the electrode group 2 and the electrode group 2 is inserted into the case 1. At this time, the sealing plate 4 is pressed into the inside of the case 1.

(3) The interface between the outside edges of the sealing plate 4 and the inner walls of the case 1 is welded by a method such as laser welding.

A prismatic battery fabricated by the above method has the drawback that pinholes readily form when the interface between the sealing plate and the case is welded. Pinholes are the cause of battery liquid and gas leaks and reduce the yield of the product. Pinholes result from welding failure between the sealing plate and the case. The present inventor changed various welding conditions in an effort to prevent the occurrence of pinholes. However, pinholes could not be effectively prevented by varying welding conditions alone.

At this point, the present inventor made further detailed analysis of the elements of pinhole generation. As a result, the frequent generation of pinholes when aluminum was used for the sealing plate and the case was noted. The present inventor theorized that the root cause of pinhole generation was related to the strength of the sealing plate rather than to welding failure. Further experiments were repeatedly performed including detailed analysis of the location of initial pinhole generation. As a result of this analysis it was determined that pinhole generation in the region close to the electrode rivet was limited.

From the results of the above analysis, the present inventor found that deformation of the sealing plate during electrode rivet attachment is the greatest root cause of pinholes. When the electrode rivet is attached to the sealing plate in a clasp-and-seal configuration, both sides of the sealing plate are strongly pressed to compress the sealing plate material locally and make it thinner. Since the gasket and insulating plate are sandwiched between the electrode rivet and sealing plate, it is difficult to imagine metal sealing plate deformation even though the electrode rivet is attached to the sealing plate in a clasp-and-seal configuration. This is because the metal sealing plate should have sufficient strength and because the gasket and insulating plate act as a buffer so the electrode rivet does not directly contact and sandwich the sealing plate. Regardless, when the electrode rivet is attached in a clasp-and-seal configuration to the metal sealing plate via the gasket and insulating plate, the riveted region of the sealing plate is compressed and thinned. This widens the outer edge of the sealing plate 4 locally distorting the sealing plate 4 shape as shown by the broken lines in the plan view of FIG. 2. Bulges in the sealing plate shape occur in the region next to the electrode rivet. When the outer edge of the sealing plate bulges locally, vacancies, shown by the cross-hatched region of FIG. 4, are created between the case 1 and the sealing plate 4 when the sealing plate 4 is inserted in the case 1. The sealing plate 4 contacts the inner walls of the case 1 in regions where it bulges outward and is separated from the inner walls of the case 1 in regions where it does not bulge outward. However, the degree of sealing plate bulging due to electrode rivet attachment is extremely small.

Consequently, vacancies created between the sealing plate and case are also extremely small making determination of the root cause of pinholes particularly difficult. However, even though vacancies between the sealing plate and case are extremely small, intimate contact is not obtained between the sealing plate outer edges and the case inner walls. Consequently, when the sealing plate and case are weld attached by a method such as laser welding, pinholes are generated.

The present invention was developed to overcome this drawback. It is thus a primary object of the present invention to effectively prevent pinhole generation between the sealing plate and case and provide a prismatic battery which can be manufactured in quantity with high yield.

The above and further objects and features of the invention will more fully be apparent from the following detailed description and the accompanying drawings.

SUMMARY OF THE INVENTION

To achieve the above object, the prismatic battery of the present invention is provided with the following configuration. The prismatic battery comprises a metal case, a metal sealing plate which is weld attached at its edges to the case opening to seal the case closed, an electrode rivet which sandwiches an insulating gasket between the rivet and the sealing plate and passes through the sealing plate electrode hole to attach to the sealing plate in an electrically isolated clasp-and-seal configuration, and an electrode group housed within the case and connected from either the positive or negative electrode plate to the electrode rivet.

Further, the prismatic battery of the present invention is provided with a reinforcement rib around the periphery region. The reinforcement rib is formed thicker than the riveted section of the sealing plate where the electrode rivet is attached in a clasp-and-seal configuration. The outer edges of the reinforcement rib make intimate contact with the inner walls of the case and are weld attached without pinholes to the inner walls of the case by a method such as laser welding.

A sealing plate with a reinforcement rib around the periphery is easily fabricated, for example, by pressure rolling sheet metal. In this method, a metal plate is locally compressed to form thinner rivet regions where the electrode rivets are to be attached in clasp-and-seal configurations. The metal plate is subsequently cut with the rivet regions centered to form sealing plates. A sealing plate fabricated by this method has a reinforcement rib around the periphery which is formed thicker than the interior rivet region. The reinforcement rib has a thickness equal to the metal plate prior to pressure rolling and the rivet region has the fully compressed thickness resulting from pressure rolling.

The prismatic battery of the present invention has the periphery of the sealing plate formed into a thick reinforcement rib. The reinforcement rib strengthens the perimeter of the sealing plate and prevents sealing plate deformation when the electrode rivet is attached to the rivet region in a clasp-and-seal configuration. Even if the rivet region is further compressed by riveting the electrode rivet to the sealing plate, the shape of the sealing plate cannot deform to bulge outward because the periphery is reinforced. A sealing plate which maintains its proper shape without distortion can make contact with the inner walls of the case without forming vacancies. When the case and the sealing plate are weld attached with good intimate contact at the interface, pinholes are not generated. This is because mutual contact between the sealing plate and the case enable them to weld attach without vacancies when they are melted together.

The prismatic battery of the present invention has the feature that pinhole generation between the sealing plate and the case is drastically reduced with an extremely simple structure which can be efficiently manufactured in quantity with high yields. This is because the prismatic battery of the present invention is provided with a reinforcement rib around the periphery of the sealing plate, and this reinforcement rib strengthens the perimeter of the sealing plate to prevent its shape from distorting. Since the electrode rivet is joined to the sealing plate in a clasp-and-seal configuration by riveting, large pinching forces act locally on the sealing plate trying to expand its shape during riveting. In the prismatic battery of the present invention, the reinforcement rib prevents this tendency of local sealing plate expansion when the electrode rivet is joined in a clasp-and-seal configuration. Consequently, the sealing plate does not distort when the electrode rivet is riveted. The undistorted sealing plate pressure fits snugly in the case opening without forming vacancies. The gap free interface between the perimeter of the sealing plate and the inner walls of the case is weld attached by a method such as laser welding in a manner that does not allow pinhole formation.

DETAILED DESCRIPTION OF THE INVENTION

Figure 1:
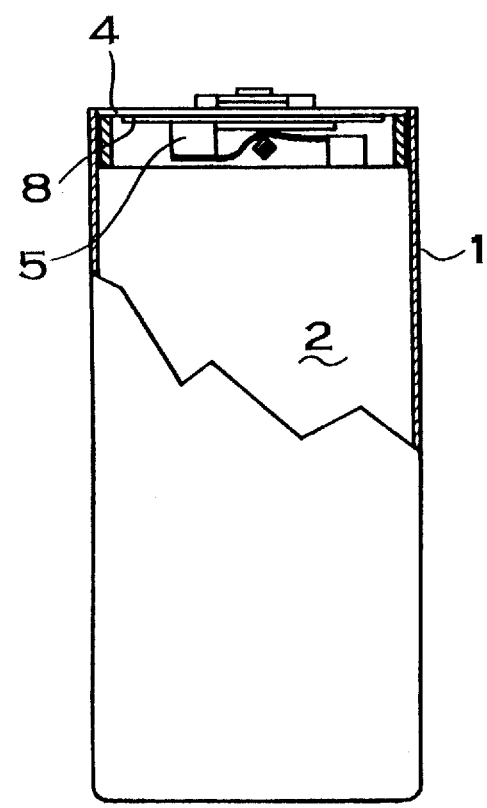
FIG. 1 is a cross-sectional view of a prior art prismatic battery.
Figure 2:
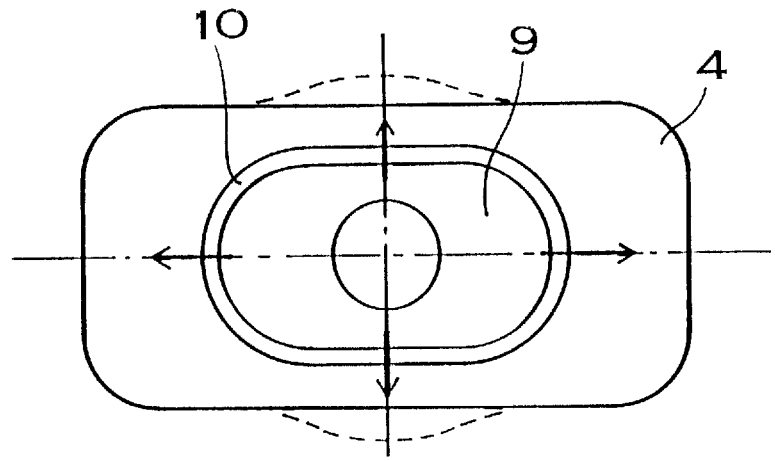
FIG. 2 is a plan view of a sealing plate of the prismatic battery shown in FIG. 1.
Figure 3:
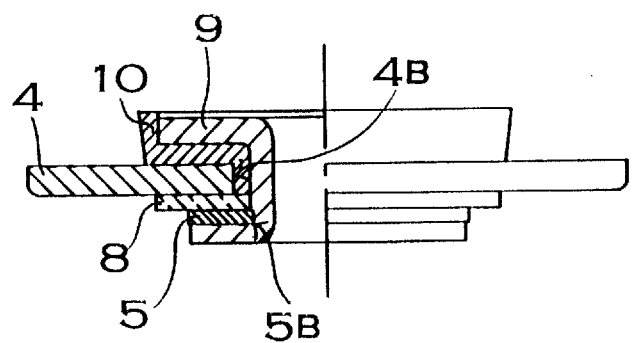
FIG. 3 is a cross-sectional view across the width of the sealing plate of the prismatic battery shown in FIG. 1.
Figure 4A:
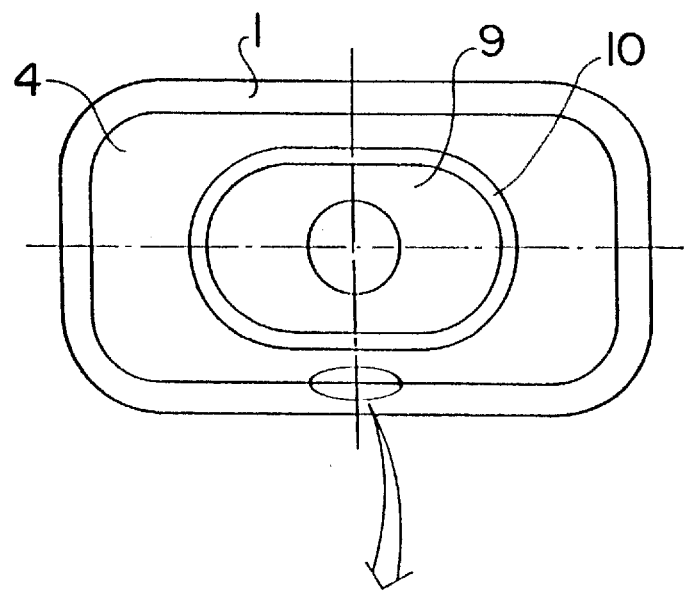
FIG. 4 is a partially enlarged plan view showing the region of contact between the sealing plate and the case of the battery shown in FIGS. 1–3.
Figure 4B:
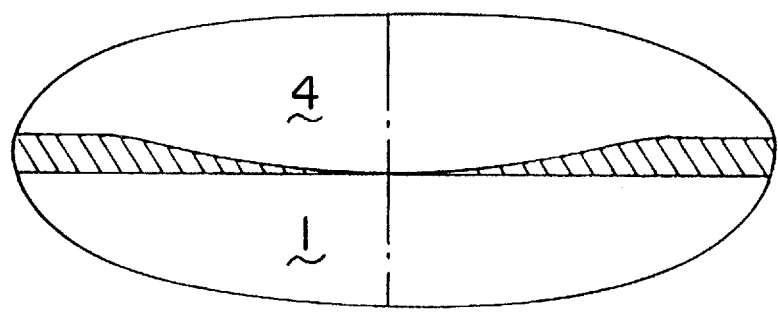
Figure 5:
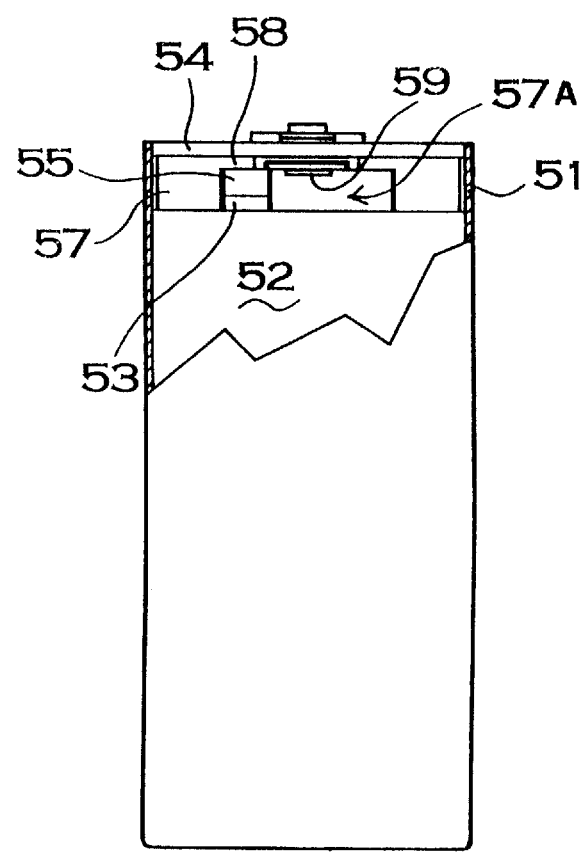
FIG. 5 is a cross-sectional view of an embodiment of the prismatic battery of the present invention.
Figure 6:
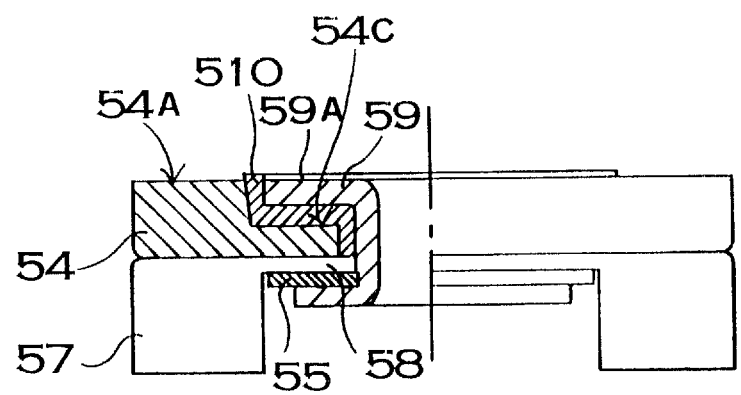
FIG. 6 is a cross-sectional view across the width of the sealing plate of the prismatic battery shown in FIG. 5.
Figure 7:
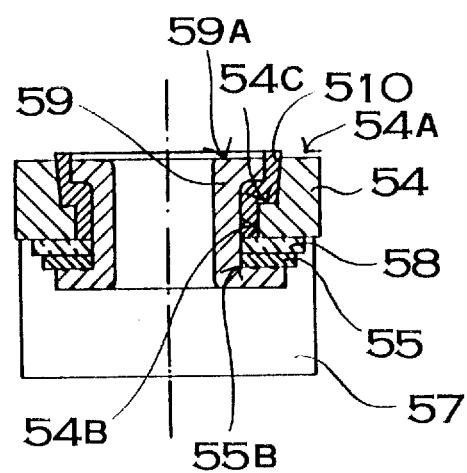
FIG. 7 is a cross-sectional view across the depth of the sealing plate of the prismatic battery shown in FIG. 5.
Figure 8:
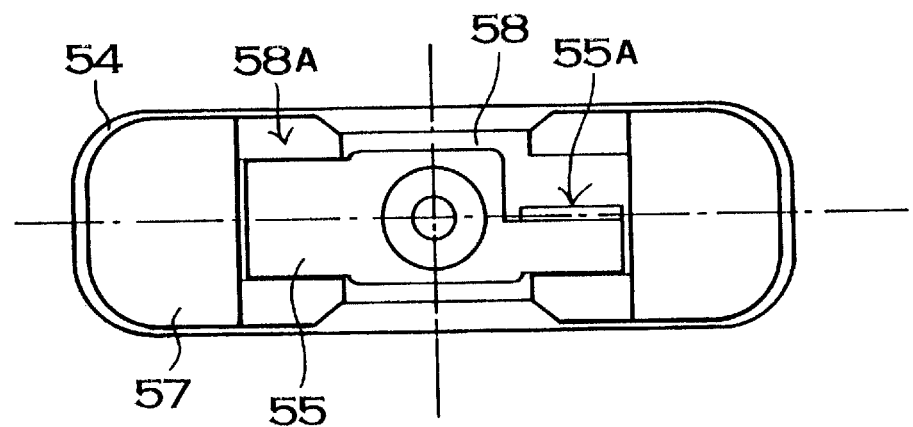
FIG. 8 is a view from beneath the sealing plate of the prismatic battery shown in FIG. 5.

FIG. 5 is a cross-sectional view of the prismatic battery, FIGS. 6 and 7 are cross-sectional views of the sealing plate of the prismatic battery of FIG. 5, and FIG. 8 is a view from beneath the sealing plate. The prismatic battery shown in these and other drawings is provided with a case 51, an electrode group 52 which is inserted into the case 51, and a sealing plate 54 which closes off an opening in the case 51 by weld attachment of its outer perimeter to the case opening. An electrode rivet 59 is fixed to the sealing plate 54. A sealing unit tab 55 is connected to the electrode rivet 59, and the sealing unit tab 55 is connected by weld attachment to an electrode tab 53 which leads out from the electrode group 52. A gasket 510 is provided between the sealing plate 54 and the electrode rivet 59, and an insulating plate 58 is provided between the sealing plate 54 and the sealing unit tab 55. Spacers 57 integral with the insulating plate 58 are disposed above the electrode group 52 to prevent displacement of the electrode group 52.

The case 51 is a rectangular box made of a metal such as aluminum or iron (with approximately square corners) having a closed bottom and an open top. The prismatic battery shown in FIG. 5 has, for example, the case 51 taken to be the positive electrode and the electrode fixed to the center of the sealing plate 54 taken to be the negative electrode. However, the case 51 may also be taken to be the negative electrode with the sealing plate electrode taken to be the positive electrode.

Figure 9:
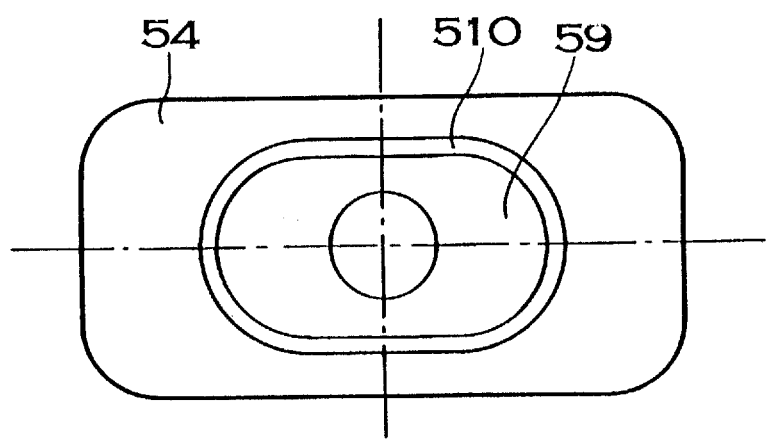
FIG. 9 is a plan view of the sealing plate of the prismatic battery shown in FIG. 5.

As shown by the cross-sectional view across the sealing plate width of FIG. 6, the cross-sectional view across the depth of FIG. 7, and the plan view of FIG. 9, a reinforcement rib 54A is provided around the periphery of the sealing plate. A recessed region is provided at the center of the upper surface of the sealing plate 54, and this recessed region establishes the rivet region 54C where the electrode rivet inserts and attaches. The reinforcement rib 54A is formed thicker than the rivet region 54C. An aluminum sealing plate used in a prismatic battery may, for example, have a rivet region thickness of 0.4 mm and a reinforcement rib thickness of 1 mm. The recessed rivet region of a long narrow sealing plate has a shape which is extended in the lengthwise direction of the sealing plate (the widthwise direction of the prismatic battery). The sealing plate 54 shown in the drawings has a reinforcement rib 54A which projects upwards from the upper surface around the periphery of the sealing plate 54. The recessed rivet region 54C is disposed inside the reinforcement rib 54A of the sealing plate 54 with this shape. The electrode rivet 59 is inserted in this recessed rivet region 54C and is secured to the sealing plate 54. However, the prismatic battery of the present invention may also have the recessed region, which establishes the rivet region, provided on the lower surface of the sealing plate.

The sealing plate 54 is fabricated from a metal such as aluminum or iron either by cold rolling or hot rolling. However, the sealing plate can also be made not by pressure rolling but rather by metal casting. In particular, an aluminum sealing plate can also be made by the die-cast method which injects aluminum into a mold. The metal rolling method has the advantage that sealing plates can be easily and cheaply fabricated in quantity. After forming rivet regions in a metal plate, sealing plates are fabricated in the metal rolling method by cutting a specified shape around the rivet regions. This method has the feature that precisely shaped sealing plates can be manufactured. If the sealing plate is first cut to shape and then rolled to form the rivet region, bulges in the sealing plate shape result when pressure rolled.

Figure 10:
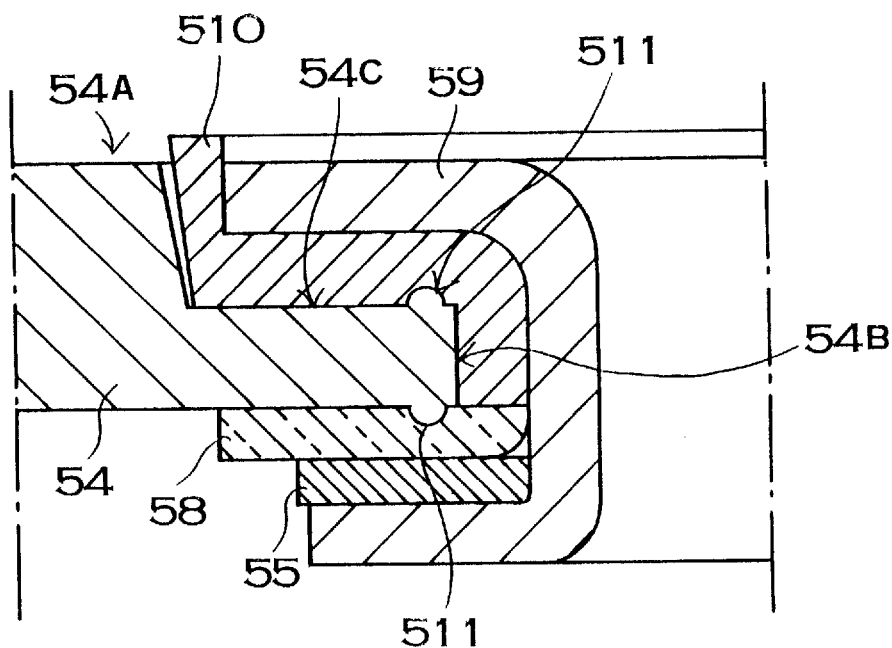
FIG. 10 is an enlarged cross-sectional view of the region near an electrode hole in the sealing plate of the prismatic battery shown in FIG. 5.

An electrode hole 54B is opened through the center of the sealing plate 54 rivet region 54C to allow the electrode rivet 59 to pass through in a manner that does not contact the sealing plate 54. As shown by the enlarged cross-section of FIG. 10, projections 511 are provided around the edge of the electrode hole 54B. In a sealing plate 54 formed by pressure rolling, the projections 511 can easily be formed at the metal rolling step. Metal rolling has the characteristic that well shaped projections 511 with no voids in the surfaces can be formed. However, projections can be provided during molding on a sealing plate 54 made by metal casting or die-casting.

The sealing plate 54 is weld attached to the inner walls of the case 51, for example, by a method such as laser welding. The sealing plate 54 is pressure fit without gaps into the opening in the case 51 for weld attachment. The sealing plate 54 is cut to a shape equivalent to the shape of the inside of the case 51 opening so no gaps are formed between the sealing plate 54 and the case 51.

Turning to FIGS. 6 and 7, the sealing unit tab 55 is attached to the lower surface of the sealing plate 54 via the electrode rivet 59 through the center of the sealing plate 54. Since the sealing unit tab 55 and the electrode rivet 59 are required to be conductive, they are made of metal. Since the electrode rivet 59 must attach to the sealing plate 54 in a sturdy clasp-and-seal fashion, it is made of nickel plated iron for example. The electrode rivet 59 has a cylindrical shape with an elliptical flange 59A at the top and it forms a clasp-and-seal configuration connecting its lower end to the sealing unit tab 55. The size of the top flange 59A is such that the major and minor axes of its outer edge are slightly less than those of the recessed rivet region 54C provided in the upper surface of the sealing plate 54. The purpose of this is to seat the rivet flange 59A in the rivet region 54C and to prevent the electrode rivet 59 from contacting the sealing plate 54. The cylindrical part of the electrode rivet 59 passes through the gasket 510, the sealing plate 54, the insulating plate 58, and the sealing unit tab 55, and it is riveted to connect its lower end to the sealing unit tab 55 in a clasp-and-seal configuration. The electrode rivet 59 and the sealing unit tab 55 are riveted to the sealing plate 54 in a manner that sandwiches the gasket 510 and the insulating plate 58. The electrode hole 54B is provided through the rivet region 54C for electrode rivet 59 insertion through the sealing plate 54 without contact to prevent short circuits.

The electrode rivet 59 is attached to the sealing plate 54 in an electrically isolated fashion. The sealing unit tab 55 is also attached to the sealing plate 54 in an electrically isolated fashion. The gasket 510 is sandwiched between the electrode rivet 59 and the sealing plate 54 to fix the electrode rivet 59 to the sealing plate 54 in a clasp-and-seal configuration with electrical isolation. The insulating plate 58 is sandwiched between the sealing unit tab 55 and the sealing plate 54 to fix the sealing unit tab 55 to the sealing plate 54 in an electrically isolated fashion. The gasket 510 is made of plastic with exceptional insulating properties.

Figure 11:
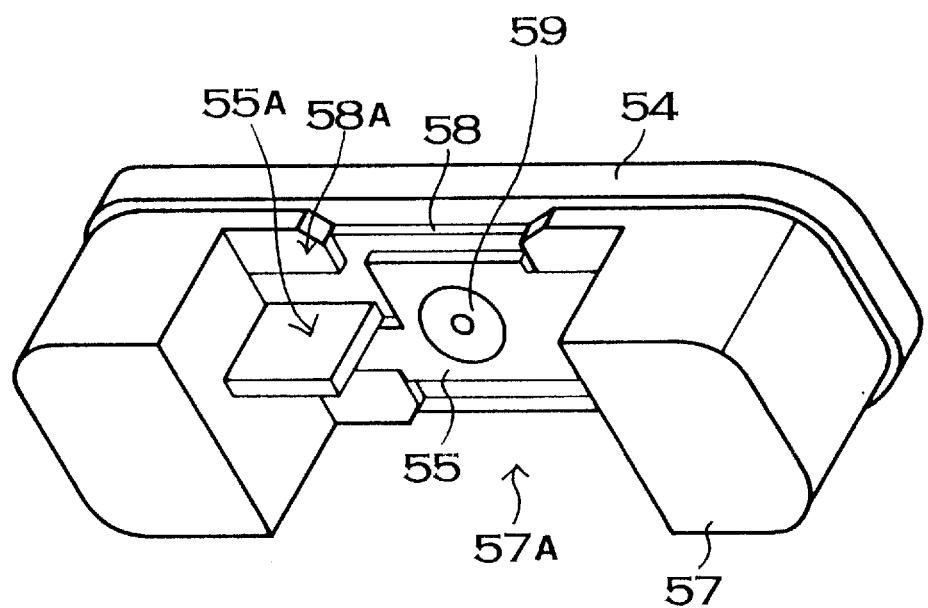
FIG. 11 is an oblique view from beneath the sealing plate of the prismatic battery shown in FIG. 5.

Turning to FIG. 11, the insulating plate 58 which electrically isolates the sealing unit tab 55 is shown. An insulating material which can be molded is used for the insulating plate 58, and the insulating plate 58 is molded as an integral unit with the spacers 57. Plastics which can be molded such as polyethylene resin, nylon resin, and polypropylene resin, and inorganic powders including materials such as silica and alumina which are molded and sintered can be used as insulating materials. As shown in FIG. 11, the insulating plate 58 is formed with a shape slightly smaller than that of the sealing plate 54. This not only allows easy insertion of the insulating plate 58 into the case, but also prevents heating of the outer edges of the insulating plate 58 during weld attachment of the perimeter of the sealing plate 54 to the case. Therefore, the sealing plate 54 can be weld attached to the case without deforming a molded plastic insulating plate 58 due to welding heat. Since the insulating plate 58 is attached to a fixed position on the sealing plate 54, it has a fixed position in the case via the sealing plate 54. Therefore, although a slight gap may exist between the outer edges of the insulating plate 58 and the inner walls of the case, the fixed position of the insulating plate 58 does not become misaligned. An insulating plate formed from sintered inorganic powder can be formed approximately the same size as the sealing plate. This is because an inorganic insulating plate does not deform when the sealing plate is weld attached to the case.

Further, to fix the attachment position of the sealing unit tab 55, sealing unit tab stopper projections 58A are formed as an integral part of the insulating plate 58 lower surface. The stopper projections 58A are located near the four corners of the sealing unit tab 55 and are disposed on both sides of the sealing unit tab 55.

As shown in FIG. 11, spacers 57 are formed at both ends as an integral part of the insulating plate 58. As shown in FIG. 5, the spacers 57 are positioned above the electrode group 52 and prevent the electrode group 52 from sliding upward. Consequently, the spacers 57 are formed to a height such that their lower surface touches or comes in close proximity to the top of the electrode group 52. The spacers 57 are disposed at both ends of the insulating plate 58 leaving a coupling cavity 57A between the spacers 57 to avoid interfering with the connection of the sealing unit tab 55 to the electrode tab 53. If the coupling cavity 57A is made wider, the spacers 57 become smaller. Conversely, if the spacers 57 are made larger, the coupling cavity 57A becomes narrower. The coupling cavity 57A is designed to a width that al lows insertion of connecting tools from both sides during connection of the sealing unit tab 55 and the electrode tab 53. The spacers are designed to a size that prevents the electrode group 52 from sliding upwards.

If the spacers 57 are made too small, they prevent upward movement of the electrode group 52 by pressing on a small area of the electrode group 52. This results in the spacers 57 pressing on a small local area of the electrode group 52 and applying excessive force to the electrode group 52. If the spacers are large, they press on a large area of the top of the electrode group 52 and do not apply excessive force. However, if the spacers 57 are made large, the coupling cavity 57A becomes narrow. If the coupling cavity 57A is made too small, it becomes difficult to insert connecting tools to join the electrode tab 53 to the sealing unit tab 55. Consequently, the sizes of the spacers 57 and the coupling cavity 57A are designed such that the spacers 57 are large enough to prevent electrode group 52 sliding without applying excessive force and the coupling cavity 57A is wide enough to allow easy connecting tool insertion. The insulating plate 58 shown in the figures has a coupling cavity 57A with a length which is approximately half the overall length of the insulating plate 58 with the spacers 57 accounting for the remaining length.

The sealing unit tab 55 is positioned between the spacers 57 at both ends of the insulating plate 58 and is cut to a shape that can be attached between the stopper projections 58A. As shown in FIG. 11 one end of the sealing unit tab 55 is bent downward forming a weld attachment blade 55A for weld attachment of the electrode tab 53. The sealing unit tab 55 also has a hole 55B through its center for insertion of the electrode rivet 59.

The prismatic battery shown in FIG. 5 is fabricated by the following process steps.

(1) The gasket 510 is positioned in the rivet region of the sealing plate 54, and the insulating plate 58 and sealing unit tab 55 are layered on the bottom surface of the rivet region of the sealing plate 54. The cylindrical part of the electrode rivet 59 is inserted through the gasket 510, the insulating plate 58, and the sealing unit tab 55.

(2) The electrode rivet 59 is riveted in a clasp-and-seal configuration attaching the gasket 510 and the sealing unit tab 55 to the sealing plate 54. During riveting, the rivet region 54C of the sealing plate 54 is pressed upon by considerable force, but the periphery of the sealing plate 54 does not deform because of the thick reinforcement rib 54A in that region. The electrode rivet 59 sandwiches the gasket 510 and the sealing unit tab 55 sandwiches the insulating plate 58. The gasket 510 is sandwiched by the electrode rivet 59 and the sealing plate 54 and electrically isolates the electrode rivet 59 from the sealing plate 54. The insulating plate 58 is sandwiched by the sealing unit tab 55 and the sealing plate 54 and electrically isolates the sealing unit tab 55 from the sealing plate 54 to which it is attached.

(3) The electrode group 52 electrode tab 53 is weld attached to the weld attachment blade 55A of the sealing unit tab 55 which is attached to the sealing plate 54. When the weld attachment blade 55A is welded to the electrode tab 53, connecting tools are inserted into the coupling cavity 57A between the spacers 57. The connecting tools sandwich the weld attachment blade 55A and the electrode tab 53 from both sides and weld attach the two together by passing a large current. During connection of the attachment blade 55A of the sealing unit tab 55 and the electrode tab 53, the lower edges of the spacers 57 are held in contact with the upper surface of the electrode group 52. In other words, the sealing unit tab 55 is connected to the electrode tab 53 with the spacers riding on the top of the electrode group 52.

(4) The electrode group 52 is inserted into the case 51. The sealing plate 54 connected to the electrode group 52 is pressed into the opening in the case 51. The outer edges of the sealing plate 54 are weld attached to the inner walls of the case 51 by a method such as laser welding.

Figure 12:
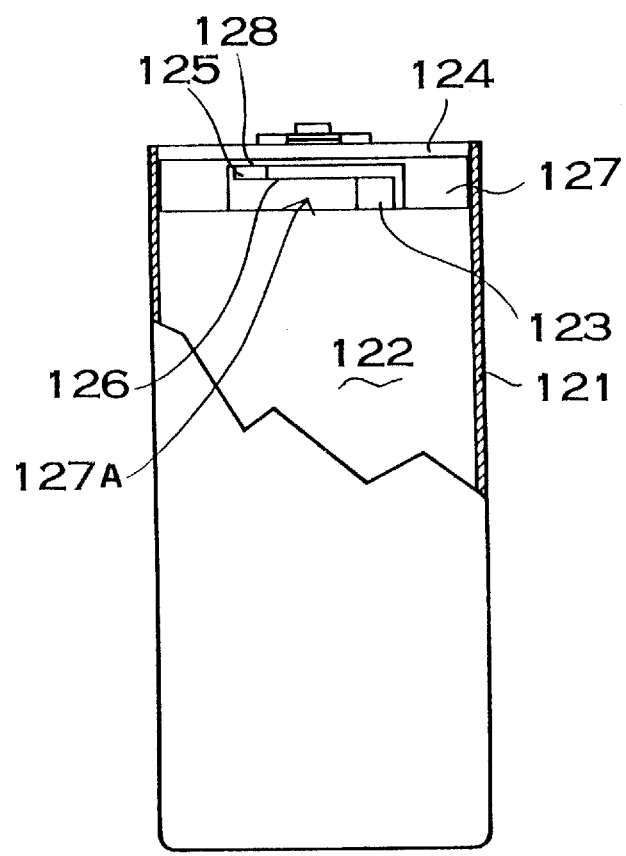
FIG. 12 is a cross-sectional view of another embodiment of the prismatic battery of the present invention.

The prismatic battery shown in FIG. 5 has the sealing unit tab 55 directly connected to the electrode tab 53. A battery with this configuration has the features that the number of parts is minimized, it can be efficiently manufactured in quantity at low cost, and it has ideal shock resistance. However, the battery of the present invention does not necessarily require that the electrode tab connect directly to the sealing unit tab. As shown in FIG. 12, the battery of the present invention may also have the sealing unit tab 125 connect to the electrode tab 123 via a connecting tab 126. Other than the use of the connecting tab 126, this battery is fabricated in the same manner as the battery shown in FIG. 5. Other elements shown in FIG. 12 and corresponding to elements of FIG. 5 are a case 121, an electrode group 122, a sealing plate 124, spacers 127, a coupling cavity 127A, and an insulating plate 128.

In the prismatic battery shown in the drawings, the lower end of the electrode rivet is inserted through the sealing unit tab and attaches to the sealing plate in a clasp-and-seal configuration. However, it is not always necessary to use a sealing unit tab. In a prismatic battery that does not use a sealing unit tab, the insulating plate is sandwiched between the sealing plate and the flange created at the bottom of the electrode rivet when it is riveted. The electrode tab or connecting tab is then connected to the electrode rivet with no intervening sealing unit tab.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalents of such meets and bounds thereof are therefore intended to be embraced by the claims.

What is claimed is:

1. A prismatic battery having an electrode group with either its positive or negative electrode plate connected to an electrode rivet and comprising:

(1) a metal case;

(2) a metal sealing plate which has a reinforcement rib outer region formed thicker than a rivet region where an electrode rivet is attached in a clasp-and-seal configuration, wherein the outer edges of this reinforcement rib outer region are weld attached to the case;

(3) an electrode rivet which sandwiches an insulating gasket between itself and the sealing plate, passes through an electrode hole in the sealing plate, and attaches in an insulating fashion to the sealing plate in a clasp-and-seal configuration; and (4) an electrode group having either a positive or negative electrode plate thereof connected to the electrode rivet, said electrode group being housed inside the case.

2. A prismatic battery as recited in claim 1 wherein the sealing plate has projections around the edge of the electrode hole, and the projections press locally on the surface of the gasket to hermetically seal the sealing plate electrode hole.

3. A prismatic battery as recited in claim 1 wherein the case is made of aluminum or an alloy of aluminum.

4. A prismatic battery as recited in claim 1 wherein the sealing plate is made of aluminum or an alloy of aluminum.

5. A prismatic battery as recited in claim 1 wherein the sealing plate is provided with a recessed region in the center of its upper surface, this recessed region constitutes the rivet region where the electrode rivet seats and attaches to the sealing plate, and the reinforcement rib outer region is provided around the rivet region.

6. A prismatic battery as recited in claim 1 wherein a periphery of the upper surface of the sealing plate protrudes out forming the reinforcement rib.

7. A prismatic battery as recited in claim 1 wherein the sealing plate is made by metal rolling.

8. A prismatic battery as recited in claim 4 wherein the sealing plate is made by die-casting.

9. A prismatic battery as recited in claim 1 wherein the sealing plate is weld attached to the inner walls of the case by laser welding.

10. A prismatic battery as recited in claim 1 wherein the electrode rivet is attached to the sealing plate and sandwiching the gasket, an insulating plate, and a sealing unit tab.

11. A prismatic battery as recited in claim 10 wherein the insulating plate is made of plastic and has integrally formed spacers which prevent the electrode group from sliding out of place.

12. A prismatic battery as recited in claim 10 wherein the insulating plate has stopper projections which align the sealing unit tab.

* * * * *